US010489396B2

(12) United States Patent
Chen et al.

(10) Patent No.: US 10,489,396 B2
(45) Date of Patent: *Nov. 26, 2019

(54) ASYNCHRONOUS UPDATES OF MANAGEMENT POLICIES IN CONTENT MANAGEMENT SYSTEMS

(71) Applicant: International Business Machines Corporation, Armonk, NY (US)

(72) Inventors: Ning Chen, Beijing (CN); Khanh M. Le, Round Rock, TX (US); Yong L. Li, Beijing (CN); Randal J. Richardt, San Jose, CA (US); Phong K. Truong, San Jose, CA (US); Alan T. Yaung, San Jose, CA (US); Xian Zou, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 130 days.

This patent is subject to a terminal disclaimer.

(21) Appl. No.: 14/168,498

(22) Filed: Jan. 30, 2014

(65) Prior Publication Data
US 2015/0213033 A1 Jul. 30, 2015

(51) Int. Cl.
*G06F 16/245* (2019.01)

(52) U.S. Cl.
CPC ................. *G06F 16/245* (2019.01)

(58) Field of Classification Search
CPC ............ G06F 17/30082; G06F 16/245
See application file for complete search history.

(56) References Cited

U.S. PATENT DOCUMENTS

| | | | |
|---|---|---|---|
| 5,689,699 A | 11/1997 | Howell et al. | |
| 7,801,863 B2 | 9/2010 | Brown et al. | |
| 8,316,197 B1 | 11/2012 | Parker et al. | |
| 8,452,741 B1 | 5/2013 | Kuhr | |
| 8,458,727 B2 | 6/2013 | Palmer et al. | |
| 2005/0256822 A1* | 11/2005 | Hollingsworth .. | G06F 17/30348 707/1 |
| 2008/0034003 A1* | 2/2008 | Stakutis ........... | G06F 17/30085 707/200 |
| 2009/0228525 A1* | 9/2009 | Fridrich ................ | G06Q 10/10 707/201 |
| 2010/0306236 A1* | 12/2010 | Cychosz ........... | G06F 17/30082 707/769 |

(Continued)

OTHER PUBLICATIONS

Below, K. et al.; "IBM WebSphere Process Server Best Practices in Error Prevention Strategies and Solution Recovery"; IBM Corporation, http://www.ibm.com/redbooks/redp-4466-00 . . . ; Dec. 2008. 92 pp.

(Continued)

*Primary Examiner* — Dawaune A Conyers
(74) *Attorney, Agent, or Firm* — Mollborn Patents, Inc.; Fredrik Mollborn

(57) ABSTRACT

Methods and apparatus, including computer program products, implementing and using techniques for a content management system. In response to determining that a change has occurred to a management policy in the content management system and in response to further determining that the content management system includes one or more items that are affected by the change to the management policy, new attribute values are associated with the items asynchronously. The new attribute values are in accordance with the changed management policy.

10 Claims, 3 Drawing Sheets

(56) References Cited

U.S. PATENT DOCUMENTS

| | | |
|---|---|---|
| 2011/0191306 A1 | 8/2011 | Akagawa et al. |
| 2012/0136904 A1* | 5/2012 | Venkata Naga Ravi ............... G06F 17/30289 707/803 |
| 2012/0212850 A1 | 8/2012 | Haustein et al. |
| 2013/0024429 A1 | 1/2013 | Raas |
| 2013/0159512 A1 | 6/2013 | Groves et al. |

OTHER PUBLICATIONS

Zhu, W-D. et al.; "Creating Value-Based Archiving Solutions with IBM Content Collector"; IBM Corporation, http://www.ibm.com/redbooks/sg24-8078-00 . . . ; Jan. 2013. 312 pp.

USPTO Non-final Office Action. U.S. Appl. No. 14/525,429. Notification Date: Oct. 20, 2015.

USPTO Office Action. U.S. Appl. No. 14/525,429. Notification Date: Mar. 14, 2016.

USPTO Office Action. U.S. Appl. No. 14/525,429. Notification Date: Aug. 10, 2016.

USPTO Office Action. U.S. Appl. No. 14/525,429. Notification Date: Jan. 5, 2017.

USPTO Office Action. U.S. Appl. No. 14/525,429. Notification Date: Sep. 22, 2017.

USPTO Office Action. U.S. Appl. No. 14/525,429. Notification Date: Apr. 18, 2018.

USPTO Office Action. U.S. Appl. No. 14/525,429. Notification Date: Feb. 21, 2019.

* cited by examiner

ASYNCHRONOUS UPDATES OF MANAGEMENT POLICIES IN CONTENT MANAGEMENT SYSTEMS

BACKGROUND

The present invention relates to content management systems, and more specifically, to updating management policies in such systems. One example of a content management system is an expiration management system. Expiration management systems typically use various types of management policies to define how long an item should be kept before it expires and should be deleted from the expiration management system. When an item is created, its expiration date is calculated and stored together with the item. After running the system for some time, many items have been created in the system. For all the items, the expiration date has been calculated based on the current policy. Suppose, however, that there is a business change to extend the expiration of the policy. The newly created items will then adhere to the new policy and their expiration dates will be calculated based on this new policy. However, the existing items should also be updated with the new expiration date. Normally, updating the expiration date for the old items is both time and resource consuming because the number of the old items might be very large (sometimes even billions of old items).

There is a need to update the expiration date during off-hours, while not affecting the expiration date based queries. The recalculation should be scheduled to be done in multiple batches rather than a single one. The query result should reflect the policy change even though the date re-calculation may only be partially done.

The same requirement applies to a retention management system. In such a system, a retention policy is used to define how long an item should be retained before it can be deleted or updated. The retention date is calculated and stored for each individual item. The date needs to be re-calculated on a policy change.

These are just two examples, and it should be realized that there are many other systems that may encounter similar problems, where a management policy is used to calculate specific attribute values for items managed by the management policy and the attribute values need to be re-calculated based on a management policy change.

One way to address these types of problems is to perform the attribute updates relating to the management policy change during off-hours. However, updating the attributes for the old items in a single batch may not be acceptable if it requires more time than can be accepted from a business point of view. This can put significant constraints on the time windows during which the management policy can change. It further requires human effort to perform work during off-hours. Another solution is to avoid storing the calculated attribute values for each of the items and instead, dynamically calculate the attribute values when needed. This type of solution would bring poor performance to various aspects of the system at runtime, particularly during queries. Thus, improved techniques for content management systems are needed.

SUMMARY

According to various embodiments of the present invention, methods and apparatus are described, including computer program products, which implement and using techniques for a content management system. In response to determining that a change has occurred to a management policy in the content management system and in response to determining that the content management system includes one or more items that are affected by the change to the management policy, new attribute values are associated with the items asynchronously. The new attribute values are in accordance with the changed management policy The details of one or more embodiments of the invention are set forth in the accompanying drawings and the description below. Other features and advantages of the invention will be apparent from the description and drawings, and from the claims.

BRIEF DESCRIPTION OF THE SEVERAL VIEWS OF THE DRAWINGS

Like reference symbols in the various drawings indicate like elements.

DETAILED DESCRIPTION

Figure 1:
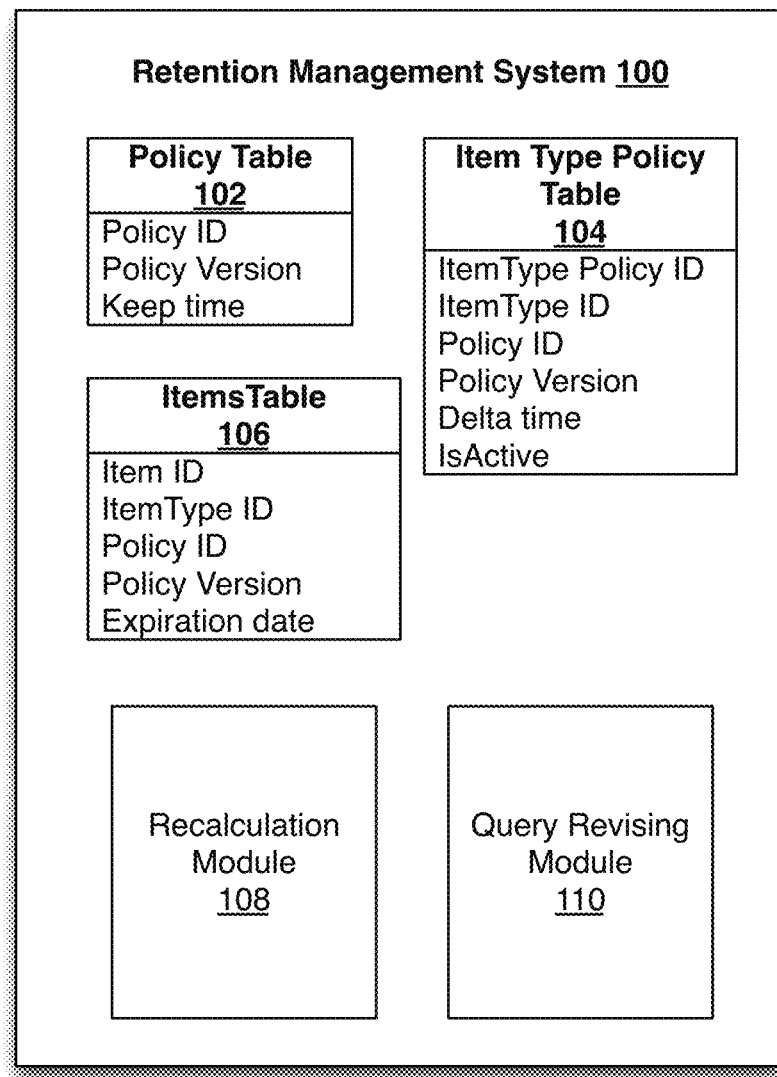
FIG. 1 shows a system, in accordance with one embodiment of the invention.

The various embodiments of this invention provide techniques for associating new attribute values with items in a content management system, as a result of a change to a management policy in the content management system. In accordance with the various techniques described herein, the new attribute values are associated with the items asynchronously, that is, in multiple batches during off-hours, since updating the attributes for the existing items typically is both time and resource consuming, especially when the number of existing items is very large. Due to the nature of these updates, it is important that queries can still be performed on the items in the content management system and that the query result accurately reflects the management policy change, even though all new attribute values may not yet have been calculated and associated with the items. Therefore, the various embodiments described herein also provide techniques for rewriting queries, such that accurate query results can be obtained, even when a management policy update has not been fully applied to all affected items in the content management system.

Some situations in which these techniques are particularly useful include re-calculating the retention/expiration dates (i.e., attribute values) asynchronously for items in retention/expiration management systems (which are two types of content management systems). Technically speaking, retention and expiration are two different concepts, even though they are sometimes used interchangeably. Retention defines how long an object should be kept before the object can be deleted. Thus, when a retention date is in place, the object cannot be deleted before this date. Expiration, on the other hand, defines how long the object can be kept before the object should be deleted. Thus, when an expiration date is in place, the object should be deleted from the system when the system time passes that date. Typically, the expiration deletion is done in batches by using a system service or some custom application. Thus, retention and expiration can co-exist in one content management system, or they can be implemented separately. In any event, the core ideas of the inventive concepts described herein can be used in retention, expiration, or both, in a content management system. For ease of explanation, the various embodiments of the invention will be described below with respect to a retention management system. However, it should be completely clear that the same concepts can be equally well implemented in an expiration management system (or even more generally, in any type of content management system in which attributes of items change as a result of a management policy change) and that the subject matter covered by the claims is not limited to retention management systems.

In one embodiment, the system includes
1. A table used to record the policies with multiple versions.
2. A table used to record the item type to policy map and also the change history of the policies that had ever been applied to an item type.
3. A table used to contain all the items that belong to the item type. The retention date is calculated and stored in this table.
4. A re-calculation module used to recalculate the retention date based on the date stored with the item and the above three tables.
5. A query-revising module used to re-construct the query used to query items whose retention date is partially updated.

This system allows the user to re-calculate the retention date during off-hours in multiple batches and keep query result consistent to the policy change at any time.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Referring now to FIG. 1, a retention management system (100) in accordance with one embodiment of the invention includes a Policy table (102), an Item Type Policy table (104), an Items table (106), a recalculation module (108) and a query revising module (110).

The Policy table (102) is used to record the policies with multiple versions. The Policy table (102) contains the following columns:
Policy ID: The identifier of the policy.

Policy version: The version number of the policy. Multiple versions of one policy can be stored in this table.

Keep Time: Time duration before which an item can be deleted.

The Item Type Policy table (104) is used to record the mapping from item types to policies and also the change history of the policies that had ever been applied to item types. The Item Type Policy table (104) contains following columns:

ItemType Policy ID: The primary key to identify the policy and item type map.

ItemType ID: The identifier of an item type.

Policy ID: The identifier of the policy that the items in an item type should obey.

Policy version: The version of the policy.

Delta time/Time difference: The time difference between the latest policy and the current policy. This can be calculated and updated when a new policy is applied for the item type. If the current policy is the latest policy, the value is set to 0.

IsActive: Whether the combination "ItemType ID/Policy ID/Policy Version) is still in use. That is, whether there are items having this combination in the item table (106), which will be described next.

The Items table (106) contains all the items that belong to a specific item type. The retention date is calculated and stored in this table. The Items table (106) contains the following columns:

Item ID: The identifier of the item.

ItemType ID: The item type identifier that this item belongs to.

PolicyID: The Policy ID, which the current retention date had been calculated based on.

PolicyVersion: The Policy Version, which the current retention date had been calculated based on.

ExpirationDate: The date on which this item expires.

Figure 2:
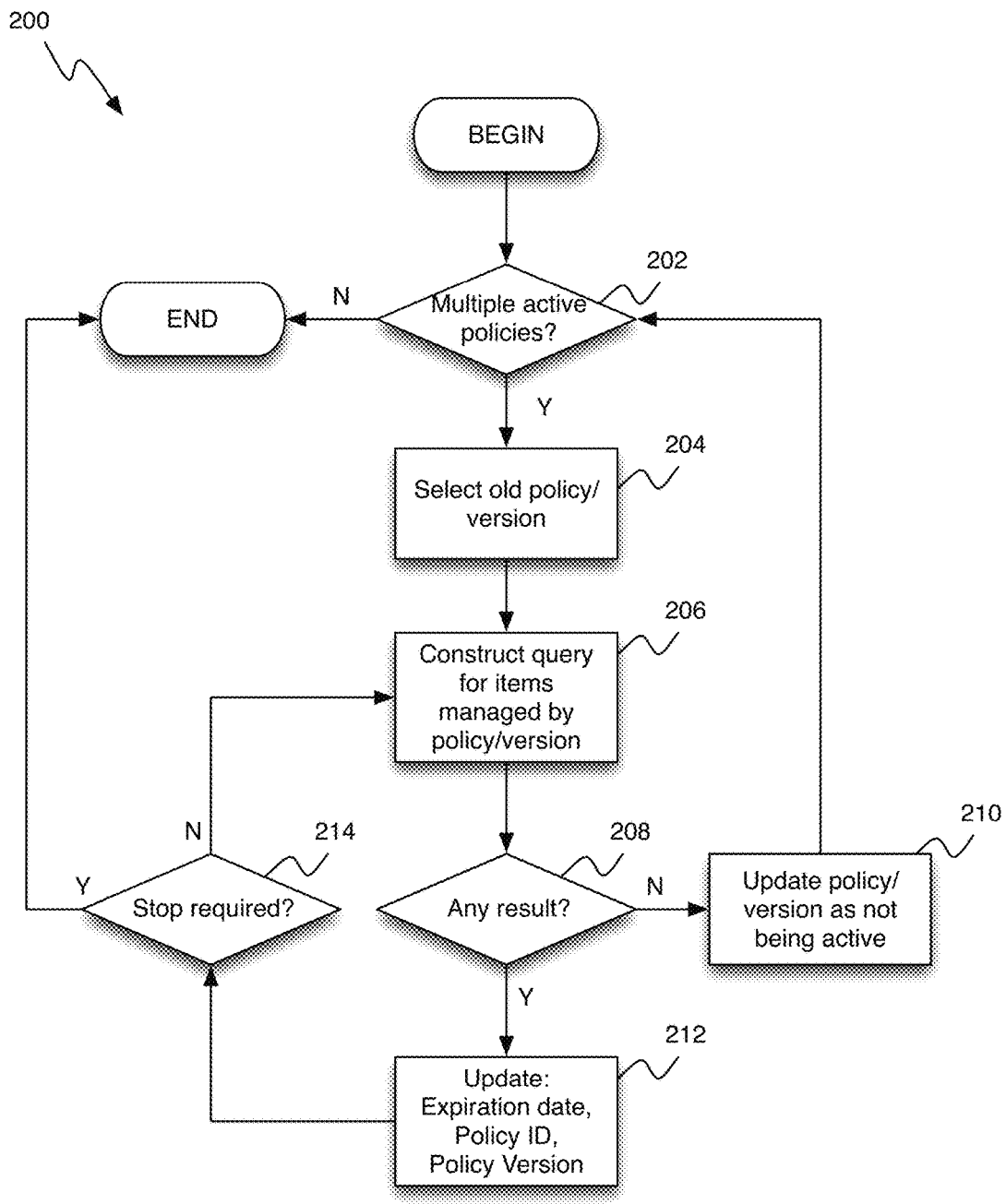
FIG. 2 shows a process for how the recalculation module of FIG. 1 operates, in accordance with one embodiment.

The re-calculation module (108) is used to recalculate the retention date based on the date stored with the item and the above two tables. FIG. 2 shows a process (200) for how the recalculation module (108) operates, in accordance with one embodiment to re-calculate and update the retention date for items in a specific item type. As can be seen in FIG. 2, the process (200) starts by determining whether there are multiple active policies in the Item Type Policy table (104) (step 202). If there is only a single policy, the process (200) ends. However, if it is determined in step 202 that there are multiple policies, an old policy/version is selected (step 204). In some embodiments, different versions can have different retention time periods, even if the policy is the same, which is why the policy/version combination is selected.

Next, the Items table (106) is queried to select a batch of items that is managed by the selected policy/version combination (step 206). The process then determines whether any result was returned from the query (step 208). If there is no result returned from the query, which means there are no items of this item type whose retention date is calculated based on the current selected policy/version combination, then the policy is updated in the Item Type Policy table (104) as not being active (step 210). However, if the query returns items whose retention date is calculated based on the current selected policy/version combination, these will be updated in the Items table (106) (step 212).

In one embodiment, the updates include:

Setting a new retention date for the items to be equivalent to the old retention date plus the time difference between the new policy version and the current policy version.

Setting the Policy ID for the items to the new Policy ID.

Setting the Policy Version for the items to the new Policy Version.

After updating the selected items, the process checks whether a stop is required (step 214). For example, there may be cases where the asynchronous updates described herein are performed as a scheduled service, and where the user can define when the asynchronous update should start and stop. When such a schedule is in place, a standalone application (or the database scheduler) can be used to timely check whether the current system time is in the scheduled window. If yes, then the asynchronous update process can be launched. If the current system time is not in the scheduled time window, then the asynchronous update process can be requested to stop. It should be realized that this is merely one example and that there might be other cases where a stop is requested directly by the user or other services or applications. Essentially, step 214 is used to give a chance to an outside controller to control the asynchronous update process. If no stop is required in step 214, the process returns to step 206, where a new batch of items is selected from the Items table (106), and continues as described above. If it is determined in step 214 that a stop is required, the process (200) ends.

Figure 3:
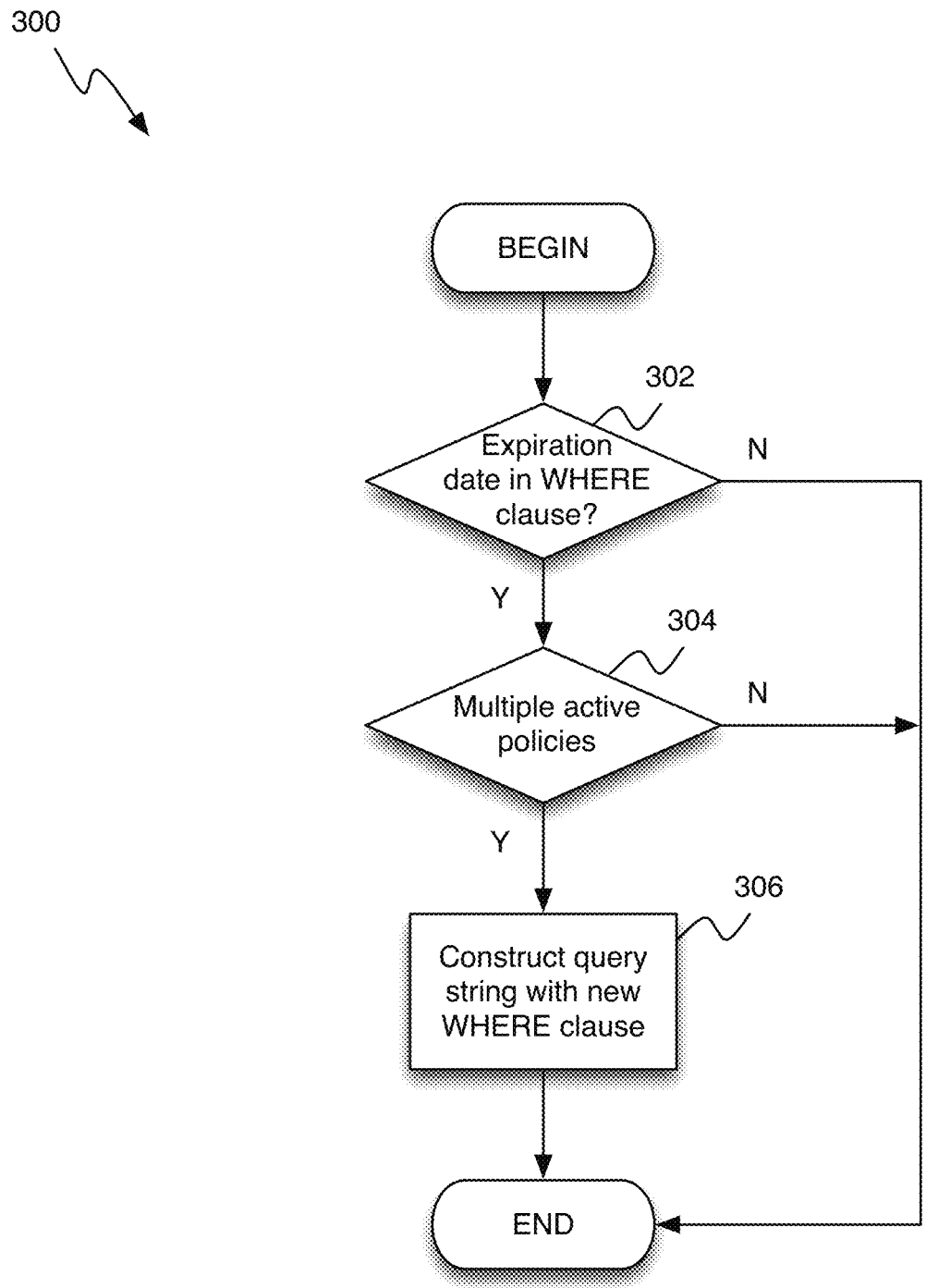
FIG. 3 shows a process for reconstructing queries, in accordance with one embodiment.

Returning now temporarily to FIG. 1, the query revising module (110) is used to re-construct the query used to query items whose retention date is partially updated. FIG. 3 shows a process (300) for reconstructing queries, in accordance with on embodiment.

As can be seen in FIG. 3, the process (300) starts by determining whether there is an expiration date in a SQL "WHERE" clause (step 302). Typically the WHERE clause is used to filter out the result set in SELECT/DELETE/UPDATE queries. If there is no expiration date in the WHERE clause, the process (300) ends. If it is determined in step 302 that there is an expiration date in the WHERE clause, the process continues to determine whether there are multiple active policies in the Item Type Policy table (104) (step 304). If there is only a single active policy in the Item Policy table (104), then the process ends.

However, if it is determined in step 304 that there are multiple active policies in the Item Policy table (104), then the process continues to step 306, where a query string is constructed for each of the active policies. In one embodiment, the WHERE clause in the query string is replaced as follows:

Old version: WHERE Expiration date <operator> (a specific date)

New version: WHERE Expiration date <operator>(old date+time difference between latest policy version and the old policy version) AND policy=old policy AND version=old policy version.

which ends the process (300).

To further illustrate the process (300) of FIG. 3, please consider the following example. Assume that a user wants to get items that expire before the timestamp: '2012-11-20-00.00.00'. If there is only one active expiration policy version (i.e., all the expiration dates are up to date) in the Policy table (102), the query string should look like:

SELECT * FROM Items WHERE ExpirationDate>'2012-11-20-00.00.00'

Now assume there are more than one active policies/versions. For example, the user may have changed policies/ versions from policy2/version3 to policy7/version2, so these two policy/version combinations exist in the Item Type Policy table (104) and both policy/version combinations are active (meaning there are some items that have not been re-calculated based on the latest policy version). Suppose also that the time difference between the two policy/version combinations is 10 days, meaning that the expiration date has to be set 10 days earlier for the older policy/version combination. After the revising of the query request, the new query is:

SELECT * FROM Items WHERE (ExpirationDate>'2012-11-10-00.00.00' AND PolicyId=2 AND policyversion=3) OR (ExpirationDate>'2012-11-20-00.00.00' AND PolicyId=7 AND policyversion=2)

As can be realized by those persons having ordinary skill in the art, the techniques described above in accordance with the various embodiments of the invention are usable in many different situations. For example, After all items with the old policy have been updated by the re-calculation module (110), or when there is only one active policy/version combination for the item type, the query for candidate items can be simply use the "SELECT * FROM Items WHERE ExpirationDate>'<expiration date>'".

In another scenario, if there are some old items in old policy/version combination that are not updated to the latest policy by the re-calculation module (110), the query revising module can also be used to get the consistent result for the latest policy. That is, it is possible to get all candidates when there are multiple active policies, and the performance is not any worse compared to a solution that always dynamically calculates the expiration date.

It should be noted that the techniques described above are merely some embodiments that illustrate a few aspects of the invention, and that there are also other variations that could be used. For example, in some content management systems, the retention date is not always calculated by the system. Instead, it can be set by the application on creation of the item, or be intentionally changed at a subsequent time by a user. During the re-calculation of the dates, the system can set a flag on the item type level or the policy level to indicate whether to override the user's action. Each of the items can have a flag to tell whether the current date had been calculated by the system, or been intentionally set by a user. This flag enables the re-calculation module to determine whether to reset the expiration date on a policy change.

In some scenarios, a user may want to apply a new retention policy to an item type that is not currently managed by any retention. The re-calculation module may need to calculate the expiration date based on the creation date of the individual items.

It should further be noted that while the above embodiments have been described with respect to retention management systems, the core concepts of this invention can also be applied to other systems that need to re-calculate a specific attributes upon a management policy change, in particular expiration management systems, as mentioned above.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention claimed is:

1. A computer program product for a content management system, the computer program product comprising a computer readable non-transitory storage medium having program code embodied therewith, the program code executable by a processor to:

in response to determining that a change has occurred to a management policy in the content management system and in response to determining that the content management system includes one or more items that are affected by the change to the management policy, associate new attribute values with the items asynchronously, wherein the new attribute values are in accordance with the changed management policy;

determine, from an Item Policy Table, whether there is more than one active management policy in the content management system; and in response to determining that there are more than one active management policy and in response to receiving a query, wherein the query includes an expiration date and pertains to items in the content management system that are subject to different active management policies, rewrite the query, by a query revising module, prior to issuing the rewritten query to the content management system, wherein rewriting the query includes:

divide the query into a separate query for each active management policy in the content management system, wherein each separate query includes a policy identifier and a policy version for the active management policy, and wherein each separate query includes a recalculated expiration date that is based on a time at which the most recent active management policy was enacted, whereby items that are subject to the different management policies are selectable by the query, and wherein the selectable items are updated in an Items Table.

2. The computer program product of claim 1, wherein:
the content management system is one of: a retention management system and an expiration management system,
the management policy is one of: a retention policy and an expiration policy, and
the attribute values include one or more of: a retention time for an item and an expiration time for an item.

3. The computer program product of claim 2, further comprising program code executable by a processor to:
store retention policies in a policy table, the policy table including for each retention policy one or more of: a retention policy identifier, a retention policy version, and a keep time for items associated with the retention policy.

4. The computer program product of claim 2, further comprising program code executable by a processor to:
store in an item type policy table one or more of: mappings between item types and retention policies, and a change history of retention policies applied to the item types.

5. The computer program product of claim 4, wherein the item type policy table includes one or more of: a key for identifying the retention policy and item type mapping, an item type identifier, a retention policy identifier, a retention policy version, a time difference between the retention policy and the changed retention policy, and indicators of active retention policies.

6. The computer program product of claim 2, further comprising program code executable by a processor to:
store, in the items table, items associated with specific item types, wherein the items table includes for each item one or more of: an item identifier, an item type identifier, a retention policy identifier, a retention policy version, and an expiration date for the item.

7. The computer program product of claim 1, further comprising program code executable by a processor to:
set a flag for each item, the flag indicating whether one or more attribute values for the item have been set manually by a user.

8. The computer program product of claim 1, further comprising program code executable by a processor to:
calculate a set of attribute values for new items that are not currently managed by the content management system, based on a creation dates for the items; and
add the new items to the content management system.

9. The computer program product of claim 1, further comprising program code executable by a processor to:
asynchronously replace a current management policy for the at least one item with a different management policy.

10. The computer program product of claim 1, wherein each management policy includes a management policy name and a management policy version.

* * * * *